United States Patent [19]

Eldridge et al.

[11] Patent Number: 4,792,818

[45] Date of Patent: Dec. 20, 1988

[54] THERMAL DROP-ON-DEMAND INK JET PRINT HEAD

[75] Inventors: Jerome M. Eldridge, Los Gatos; Francis C. Lee, San Jose; James O. Moore, San Jose; Graham Olive, San Jose, all of Calif.

[73] Assignee: International Business Machines Corporation, Armonk, N.Y.

[21] Appl. No.: 61,841

[22] Filed: Jun. 12, 1987

[51] Int. Cl.[4] .............................................. G01D 15/18

[52] U.S. Cl. .............................................. 346/140 R

[58] Field of Search .............................................. 346/140

[56] References Cited

U.S. PATENT DOCUMENTS

| | | | |
|---|---|---|---|
| 4,336,548 | 6/1982 | Kawasaki | 346/140 |
| 4,339,762 | 7/1982 | Shirato et al. | 346/140 |
| 4,514,741 | 4/1985 | Meyer | 346/140 |
| 4,577,202 | 3/1986 | Hara | 346/140 |
| 4,638,337 | 1/1987 | Torpey | 346/140 |

*Primary Examiner*—Joseph W. Hartary

*Attorney, Agent, or Firm*—Otto Schmid, Jr.

[57] ABSTRACT

A thermal drop-on-demand ink jet print head in which a heat delay means is provided covering a predetermined part of the resistive element. Upon connection of an electrical signal to energize the resistive element, nucleation occurs at an uncovered location on the resistive element and formation of the bubble proceeds in a direction toward the covered part of the resistive element to thereby utilize the inertial effect of the controlled bubble motion to eject a drop of ink in a more energy-efficient manner.

4 Claims, 1 Drawing Sheet

THERMAL DROP-ON-DEMAND INK JET PRINT HEAD

BACKGROUND OF THE INVENTION

1. Field of the Invention

This invention relates to an ink jet printing system and more particularly to a thermal drop-on-demand ink jet printing system.

2. Description of the Prior Art

A thermal drop-on-demand ink jet printing system is known in which a heater is selectively energized to form a "bubble" in the adjacent ink. The rapid growth of the bubble causes an ink drop to be ejected from a nearby nozzle. Printing is accomplished by energizing the heater each time a drop is required at that nozzle position to produce the desired printed image.

The formation of the vapor and gas "bubble" on a small heater is normally not well-controlled in terms of nucleation sites and timing. U.S. Pat. No. 4,366,548 to Matsumoto discloses a thermal drop-on-demand ink jet printing system in which the entire heater is covered by a protective layer, and the surface of the protective layer, to which the ink is exposed, is roughened. The roughness of the protective layer is described as an aid to the nucleation process in bubble formation.

U.S. Pat. No. 4,339,762 to Shirato et al relates to thermal drop-on-demand ink jet printing system in which the heat generating element is non-uniform in either thickness and/or width so that the size of the ejected drop can be controlled by controlling the amplitude of the drive signal applied to the heat generating element.

U.S. Pat. No. 4,514,741 to Meyer shows a thermal drop-on-demand ink jet printer in which the heater element comprises a resistive region having a conductive region at its center. The conductive region effectively electrically shorts the underlying area of the heater element which produces a cold spot at the center of the heater element and enables the production of a toroidally shaped bubble.

No prior art is known in which a heat delay means is utilized to cover a predetermined part of the heating means to produce a controlled bubble growth and collapse so that the print head operation is enhanced by utilizing the inertial effects of a controlled bubble motion.

SUMMARY OF THE INVENTION

It is therefore the principal object of this invention to provide a thermal drop-on-demand ink jet print head having a controlled bubble growth and collapse so that the operation can be enhanced by utilizing the inertial effect of a controlled bubble motion. In accordance with the invention, the objective is achieved by providing a heating means comprising a resistive element, and a heat delay means covering a predetermined part of the resistive element. Upon connection of an electrical signal to energize the resistive element, nucleation occurs at a predetermined location on the resistive element and formation of the bubble proceeds in a predetermined direction so that the inertial energy of the bubble formation is directed toward the nozzle to focus the energy toward the nozzle and eject a drop of ink in a more energy-efficient manner.

In a first specific embodiment coverage of the heat delay means over the resistive element starts at a first peripheral edge of the resistive element and proceeds toward a second peripheral edge. In this case the nucleation starts at the second peripheral edge, and formation of the bubble proceeds toward the first peripheral edge. In this embodiment, the nozzle is in a direction generally parallel to the plane of the resistive element.

In a second specific embodiment, coverage of the heat delay means over the resistive element is spaced from the peripheral edges of the resistive element. In this case the nucleation starts at the peripheral edges of the resistive element and the formation of the bubble proceeds inward toward the center of the resistive element. In this embodiment, the nozzle is in a direction generally normal to the plane of the resistive element.

The foregoing and other objects, features and advantages of the invention will be apparent from the following more particular description of a preferred embodiment of the invention as illustrated in the accompanying drawings.

DETAILED DESCRIPTION OF THE PREFERRED EMBODIMENTS

Figure 1:
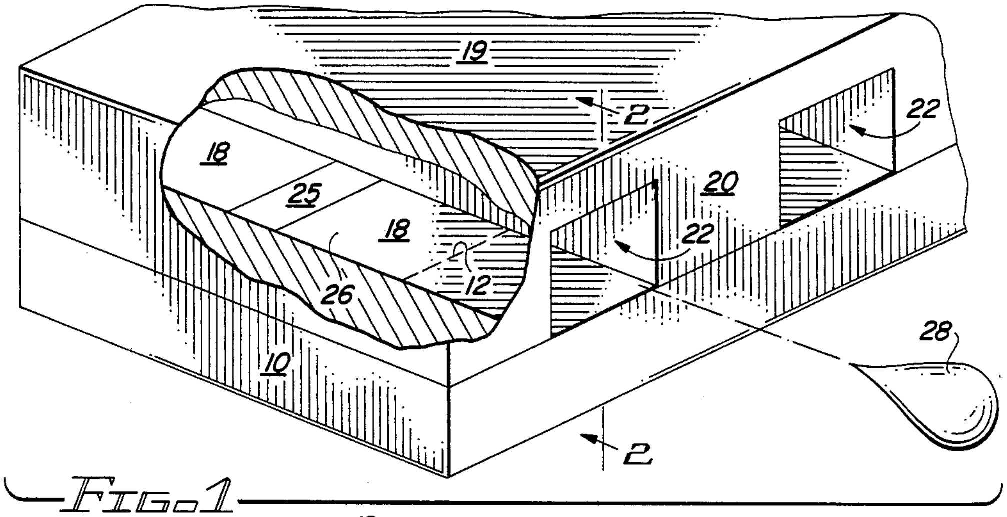
FIG. 1 is a three dimensional view, with some parts cut away, of a specific embodiment of a thermal drop-on-demand ink jet print head according to the present invention.
Figure 2:
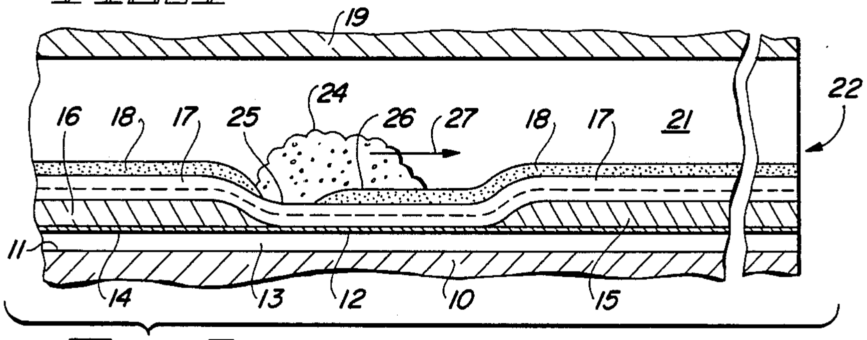
FIG. 2 is a section view taken along the lines 2—2 of FIG. 1.

Referring to FIGS. 1 and 2, the thermal drop-on-demand ink jet print head, according to the present invention, comprises a suitable substrate member 10, upon one surface 11 of which is formed an array of resistive heater elements 12, only one of which is shown in FIGS. 1 and 2 of the drawings. The resistive heater elements 12 comprise a multilayer thin film structure comprising a heat insulation layer 13 and a resistive heater film 14. Layer 13 must also be electrically insulating. A common electrode 15, and an array of control electrodes 16 make electrical contact to each of the resistive heater films 14 and electrically short all areas of the heater films 14 except the area between the electrodes 15 and 16 which forms resistive heater elements 12. A passivation layer 17 is deposited over the array of the resistive heater elements 12 and the associated electrodes 15 and 16 to prevent both chemical and mechanical damage to the resistive heater elements 12 and the electrodes 15 and 16. Preferably passivation layer 17 comprises two layers of different materials in order to reduce the incidence of flaws or pinholes in the passivation layer.

According to the present invention, a heat delay layer 18 is deposited over the resistive heater elements 12 in a position so that the heat delay layer 18 covers only part of the resistive heater element 12. A second substrate member 19 is fixed in position relative to substrate 10 so that wall members 20 define a channel 21 associated with each of the resistive heater elements 12. A nozzle 22 is provided at one end of the channel 21. An ink supply (not shown) is provided to supply a marking fluid such as ink to each of the channels 21.

The heat delay layer 18 is formed of a thermally insulating material which is tough so that bubble formation and collapse forces do not erode the structure. In addition, the material must be chosen so that it is chemically stable and compatible with the other print head components in the presence of the ink, which may also be corrosive. Suitable materials for the heat delay layer 18 include $SiO_2$, $Si_3N_4$, SiON, $Al_2O_3$, $Ta_2O_5$, $TiO_2$, $ZrO_2$ and SiC. These materials can be deposited in a variety of ways that are known in the art. The preferred materials are the group comprising SiC, $SiO_2$ and $Si_3N_4$. The heat delay layer must be relatively thin so that the heat delay is very brief. A range of 300 to 6000 angstroms has been found to be suitable depending on the thermal properties of the material used. In a specific embodiment a layer of $SiO_2$, 400 angstroms thick, was found to be suitable.

In operation, a data pulse is supplied to control electrode 16 to energize the associated resistive heater element 12 to produce a bubble 24 in the ink adjacent heater element 12. The heat delay layer 18 is patterned to allow initial heating at a specific uncovered area 25 of the resistive heater element 12 and to delay the heat flow to the ink briefly in the covered area 26 of the resistive heater element 12. As shown in FIG. 2, the bubble nucleates at the left side, then it grows toward the right side so that the inertial effects of a controlled bubble motion to the right as shown by arrow 27 forces a drop 28 of ink from the associated nozzle 22. This mode of operation has the advantage that bubble formation can be started at a preselected location and proceed in a selected direction thereby achieving a greater velocity of bubble movement for both the growth and collapse phases. During bubble growth, this bubble motion induces a higher drop ejection velocity, and, during the collapse phase, the direction of bubble shrinkage aids the refilling process toward the nozzle.

Figure 3:
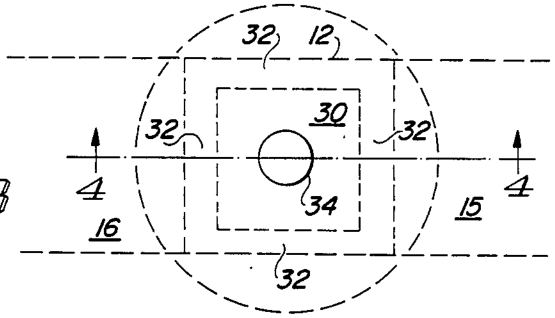
FIG. 3 is a plan view of a further specific embodiment of a thermal drop-on-demand ink jet print head according to the present invention.
Figure 4:
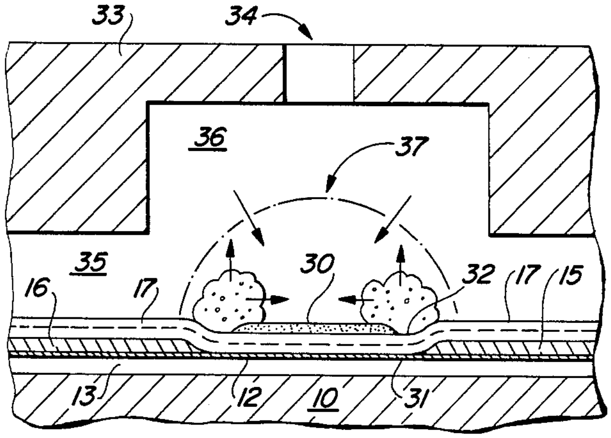
FIG. 4 is a section view taken along the lines 4—4 of FIG. 3.

An alternative embodiment of a thermal drop-on-demand ink jet print head is shown in FIGS. 3 and 4. The print head utilizes a substrate 10, a heat insulation layer 13, a resistive heating elements 12, a common electrode 15 and an array of control electrodes 16. A passivation layer 17 is provided to protect the resistive heating element 12, common electrode 15 and control electrode 16. In this case a heat delay layer 30 is provided which covers only part of the resistive heating elements 12. As shown in FIG. 4, heat delay layer 30 covers the central area 31 of resistive heating element 12 and leaves uncovered the edge areas 32 of the resistive heating element 12. A second substrate 33 is fixed in position adjacent substrate 10 so that a nozzle 34 is opposite each of the resistive heating elements 12. Substrate 33 is shaped to provide an ink inflow channel 35 to distribute the marking fluid such as ink to the print cavity 36 which holds a predetermined volume of ink between the resistive heater elements 12 and nozzle 34.

In operation, a data pulse is supplied to control electrode 16 to energize the associated resistive heater element 12 to produce a bubble in the ink adjacent to resistive heater element 12. Since in this case the central area 31 of the resistive heater element 12 is covered by the heat delay layer 30, nucleation starts on the edge areas 32 of the resistive heater element 12 and the bubble grows toward the center. This action causes a "squeeze" action on the ink in the middle thereby focusing the pressure wave generated by the bubble formation along the center line leading to the nozzle 34. By proper choice of the size of the heat delay layer 30, the growth of the ring bubble coalesces at the center thereby forming a hemispherical bubble 37 over the resistive heater element 12. The bubble collapses symmetrically toward the center thereby aiding the refilling process from the side inflow channels 35. Thus it can be seen that a simple heat delay layer 30 added to the usual thermal drop-on-demand ink jet structure provides inertial enhancement of the bubble jet operation. A controlled bubble growth and collapse movement enhances drop ejection thereby reducing drive requirements and assists the refilling process thereby eliminating frequency limitations due to flow constraints.

While the invention has been particularly shown and described with reference to a preferred embodiment thereof, it will be understood by those skilled in the art that various other changes in the form and details may be made therein without departing from the spirit and scope of the invention.

Having thus described my invention, what I claim as new, and desire to secure by Letters Patent is:

1. A thermal drop-on-demand ink jet print head comprising:

a nozzle adjacent to a heating means with a marking fluid between;

whereby upon connection of an electrical signal to energize said heating means bubble formation occurs in said marking fluid adjacent said heating means and a drop of ink is ejected from said nozzle, the improvement comprising:

said heating means comprising a resistive element having a predetermined area; and heat delay means covering a predetermined fractional part of said predetermined area of said resistive element, said predetermined fractional part of said resistive element covered by said heat delay means being spaced from the peripheral edges of said resistive element, whereby, upon connection of an electrical signal to energize said resistive element, nucleation occurs at a predeterimined location on said resistive element and formation of said bubble proceeds in a predetermined direction whereby inertial energy of said bubble formation is directed toward said nozzle to thereby focus said energy in said predetermined direction and eject said drop of ink in a more energy-efficient manner.

2. The thermal drop-on-demand ink jet print head of claim 1 wherein said nucleation starts at said peripheral edges of said resistive element and said formation of said bubble proceeds inward toward the center of said resistive element.

3. The thermal drop-on-demand ink jet print head of claim 2 wherein said resistive element is a planar device and said nozzle is in a direction generally normal to the plane of said resistive element.

4. The thermal drop-on-demand ink jet print head of claim 1 wherein said heat delay means comprises a layer of a heat insulating material.

* * * * *